March 29, 1960   K. N. WILLMORE   2,930,659
COMBINED DUST AND GREASE SEAL AND KEY RETAINER
Filed March 3, 1958
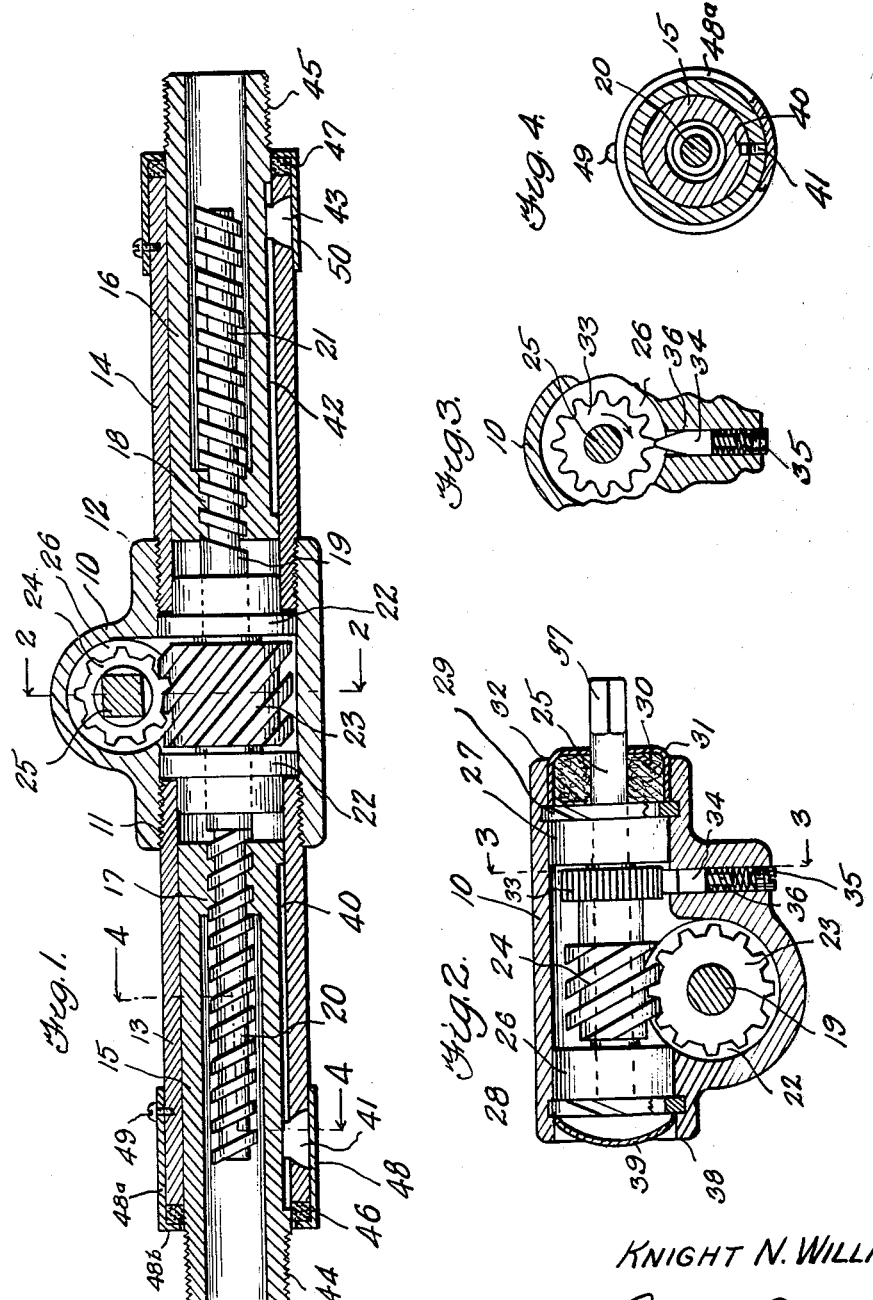
INVENTOR
KNIGHT N. WILLMORE
HIS ATTORNEY

United States Patent Office 2,930,659
Patented Mar. 29, 1960

2,930,659

COMBINED DUST AND GREASE SEAL AND KEY RETAINER

Knight N. Willmore, Fairfax, Okla., assignor of twenty-five percent to George A. Barber, Fairfax, Okla.

Application March 3, 1958, Serial No. 718,521

1 Claim. (Cl. 308—3.5)

This invention relates to a pushing and pulling device, and has for one of its objects the production of a simple and efficient means for selectively exerting a pushing or pulling pressure, the device being light, compact, and a self-contained unit which may be easily carried, is completely sealed from dirt and moisture, and the space in the head members containing the gears, screw, nuts, and all working parts, is filled with lubricant and is sealed against loss of the same.

A further object of this invention is the production of a simple and efficient device for tightening chains used in binding or securing a load of loose material such as pipe or lumber, upon a truck or other vehicle, or for use as a tool in automobile body repair shops, for use by steel workers, or in shipbuilding operations, or for use as an implement to moor airplanes to the ground to guard against damage from wind storms and the like.

Other objects and advantages of the present invention will appear throughout the following specification and claim.

In the drawing:

Figure 1 is a longitudinal sectional view through the pushing and pulling device;

Figure 2 is a transverse sectional view taken on line 2—2 of Figure 1;

Figure 3 is a fragmentary sectional view taken on line 3—3 of Figure 2;

Figure 4 is an irregular transverse sectional view taken on line 4—4 of Figure 1.

By referring to the drawing in detail, it will be seen that 10 designates the head-member or central housing having internally threaded opposite open ends 11 and 12. Tubular casings 13 and 14 are threaded into the respective ends 11 and 12 and protrude laterally in opposite directions from the housing 10. A longitudinally slidable sleeve 15 is mounted within the casing 13, and a longitudinally slidable sleeve 16 is mounted within the casing 14. The sleeve 15 is provided with a nut-portion 17 at its inner end, and the sleeve 16 is provided with a similar nut-portion 18 at its inner end.

A screw shaft 19 is carried within the housing 10, and is provided with a right-hand threaded portion 20 and a left-hand threaded portion 21 extending laterally of the housing 10. The right-hand threaded portion 20 is threaded through the nut-portion 17 of the sleeve 15, and the left-hand threaded portion 21 is oppositely threaded through the nut-portion 18 of the sleeve 16. The threaded portions 20 and 21 extend in opposite directions from the central housing 10, as will be seen by considering Figure 1. Suitable thrust washers 22 which also serve as bearings, support the screw shaft 19 in the central housing 10.

A spiral or worm gear 23 is carried by the screw shaft 19 intermediate or between the thrust washers 22, and meshes with a worm drive gear 24. This drive gear 24 is mounted in the housing 10 just above the spiral or worm gear 23, and is carried by a drive or operating shaft 25 which extends at right-angles to the screw shaft 19 and projects from the housing 10, as is shown in Figure 2. The gears 23 and 24 may be made integral with their respective shafts 19 and 25, or they may be pressed or keyed thereon as is common to the trade.

Suitable conventional bushings 26 and 27 constituting journals for the drive or operating shaft 25, and support this shaft 25 within the upper portion of the housing 10, as is shown in Figure 2. These bushings 26 and 27 are held and secured against end thrust by means of the split spring lock rings 28 and 29 of a conventional type. A grease seal retainer 30 which contains a felt grease seal 31 in place, closes the outer end 32 of the housing 10 around the drive or operating shaft 25.

A ratchet wheel or gear 33 is fixed upon the drive or operating shaft 25, and is engaged by a spring-pressed ratchet plunger or dog 34. The tension of the spring-pressed plunger or dog 34 may be adjusted through the medium of the threaded plug 35 which closes the lower end of the plunger or dog carrying aperture 36. The inner end of the plunger or dog 34 is tapered and the terminal is flattened so as to conform to the scalloped notches formed on the periphery of the ratchet wheel or gear 33. This plunger or dog 34 in conjunction with the ratchet wheel or gear 33, serves as a restraining means to prevent unwanted rotation of the drive or operating shaft 25, and also provides a slight resistance to the turning of the shaft 25. This will facilitate the operation of the shaft 25 with a ratchet handle which would fit over the handle receiving terminal 37. The end 38 of the housing is preferably closed by means of a spring-like expansion plug 39 which abuts the lock ring 28.

It should be noted that the device herein illustrated and described may be placed in any desired position to obtain the selected pushing or pulling power so long as there is easy access to the drive and its position may vary to suit the work for which it is selected. For instance, the device may be placed in a position to extend the shaft 25 in a horizontal position, as shown in Figure 2, or in a position at right-angles to that shown in Figure 2 where the shaft 25 may extend vertically with the end 38 at the bottom of the device. The selective positioning of the device is well within the scope of the invention, since it is important because of the varied use of the device, that the device be not limited as to its position relative to the work it is to perform.

As is shown in Figures 1 and 4, the sleeve 15 is provided with a longitudinally extending slot 40 and receives a key 41 which is carried by the casing 13, to hold the sleeve against rotation and at the same time permit sliding movement of the sleeve 15. A similar slot 42 is formed in the sleeve 16 to receive a key 43 which is fixed to the casing 14. The outer end of the sleeve 15 is externally threaded, as at 44, and the outer end of the sleeve 16 is also externally threaded, as at 45, for the purpose of facilitating the attachment of various accessories, such as hooks, extensions, or various shaped ends for exerting either a pulling or pushing force.

A suitable seal 46 is carried at the outer end of the casing 13 to provide a dust and grease seal, and at the same time permit the sleeve 15 to freely slide. A similar seal 47 is carried at the outer end of the casing 14, for the same purpose. The seal 46 is held in place by an end collar 48 which fits over the outer end of the casing 13, and also engages the key 41 to releasably hold the same in place. The collar 48 includes a skirt portion 48a and an annular, inwardly projecting flange 48b at its outer end. The collar is anchored upon the casing 13 by means of a set screw 49. A similar collar 50 fits over the outer end of the casing 14 to retain the seal 47 and to retain the key 43. This collar 50 is retained by means of a set screw 51.

Having described the invention what is claimed as new is:

In a pushing and pulling device including a casing, a longitudinally slidable sleeve mounted therein, said casing carrying a key and said sleeve having a key receiving slot therein, a combined dust and grease seal and key retainer comprising a collar having a skirt portion and an annular, inwardly projecting flange at its outer end, said skirt portion fitted over the outer end of said casing and retaining said key, a dust and grease seal retained between said flange and the end of said casing in wiping engagement with said sleeve, and means for releasably securing said retainer to said casing.

References Cited in the file of this patent

UNITED STATES PATENTS

| | | |
|---|---|---|
| 507,095 | Towne et al. | Jan. 2, 1894 |
| 707,095 | Fox | Aug. 19, 1902 |
| 1,012,008 | Post | Dec. 19, 1911 |
| 1,037,615 | Grenier | Sept. 3, 1912 |
| 1,945,075 | Richards et al. | Jan. 30, 1934 |
| 2,220,288 | Sarosdy | Nov. 5, 1940 |
| 2,403,828 | Rawlins et al. | July 9, 1946 |
| 2,407,696 | Webster | Sept. 17, 1946 |
| 2,687,046 | Vorech | Aug. 24, 1954 |
| 2,713,522 | Petch | July 19, 1955 |
| 2,803,224 | Wilson | Aug. 20, 1957 |
| 2,822,199 | Johnson | Feb. 4, 1958 |